United States Patent [19]
Makosch et al.

[11] Patent Number: 5,341,736
[45] Date of Patent: Aug. 30, 1994

[54] SAFETY DEVICE AT CYLINDERS WITH A FEED GAP IN WEB-FED ROTARY PRINTING MACHINES

[75] Inventors: Manfred Makosch, Königsbrunn; Klaus T. Reichel, Augsburg, both of Fed. Rep. of Germany

[73] Assignee: Man Roland Druckmaschinen AG, Offenbach am Main, Fed. Rep. of Germany

[21] Appl. No.: 156,077

[22] Filed: Nov. 23, 1993

[30] Foreign Application Priority Data

Nov. 28, 1992 [DE] Fed. Rep. of Germany ........ 4240142

[51] Int. Cl.⁵ .................................................. B41F 5/00
[52] U.S. Cl. ......................................... 101/212; 403/2; 403/370; 74/405
[58] Field of Search ............... 101/212, 216, 219, 183; 74/337, 405, 434, 446, 447; 403/376, 405.1, 408.1, 202, 203, 1, 2, 370

[56] References Cited

U.S. PATENT DOCUMENTS

| | | | |
|---|---|---|---|
| 531,046 | 12/1894 | King | 403/2 |
| 980,341 | 1/1911 | Roper | 403/2 |
| 1,157,098 | 10/1915 | Greene | 403/2 |
| 2,585,113 | 2/1952 | Gredell | 403/2 |
| 3,858,987 | 1/1975 | Kleinhans et al. | 403/2 |
| 4,186,570 | 2/1980 | Pourandt | 403/370 |
| 4,354,850 | 10/1982 | Piepenbreier | 74/405 |
| 4,389,202 | 6/1983 | Hochreuter | 403/2 |
| 4,425,816 | 4/1984 | Toyoda | 403/370 |
| 4,567,824 | 2/1986 | Dahlgren et al. | 101/183 |
| 4,607,971 | 8/1986 | Hartmann et al. | 403/2 |

OTHER PUBLICATIONS

Bauer/Schneider/Kaltofen: Maschinenteile Band II, Achsen, Wellen, Lager, Kupplungen, VEB-Leipzig, 1960, S. 279.

*Primary Examiner*—Eugene H. Eickholt
*Attorney, Agent, or Firm*—Cohen, Pontani, Lieberman, Pavane

[57] ABSTRACT

In cooperating cylinders, in particular cylinders of a printing mechanism which are in a drive connection via gear wheels and form a feed gap, at least one of the gear wheels is formed by a toothed rim and a wheel body which are connected with one another in a positive engagement via an overload coupling.

5 Claims, 3 Drawing Sheets

SAFETY DEVICE AT CYLINDERS WITH A FEED GAP IN WEB-FED ROTARY PRINTING MACHINES

BACKGROUND OF THE INVENTION

1. The invention is directed to a safety device in web-fed rotary printing machines at cylinders with a feed gap and, more particularly, to cylinders of a printing mechanism which are in a drive connection via gear wheels.

2. Description of the Prior Art

Problems may occur in web-fed rotary printing machines when foreign bodies enter the feed gap between two adjacent cylinders. This occurs, for example, due to wound up paper, breakage of plates and tearing of rubber blankets. It is known from general background art to provide predetermined breaking points in the couplings of the longitudinal shaft in web-fed rotary printing machines which separate the printing unit from the main shaft in the event of an accident in the printing unit. However, it may often be observed in the cases of disruption mentioned above that damage nevertheless occurs within the drive of the printing unit. For example, the drive wheels clamped on the cylinder pins will :bond with the cylinder pins. Repair in this case is costly and requires that the entire cylinder be replaced.

To prevent such damage it would also be possible to bring the cylinder pin into a friction-locking drive connection with the cylinder gear via a friction clutch or a slip clutch. However, it is difficult to accommodate such safety clutches on the cylinder pins due to their length, since spatial conditions are cramped due to other mechanisms such as those for adjusting the register. Moreover, such clutches require that the cylinder gear be mounted on the cylinder pin via roller bearings. This leads to all unacceptable increase in the radial deviation or true-running discrepancy of the cylinder gear. Further, the roller bearings are mainly statically loaded in an unfavorable manner.

SUMMARY OF THE INVENTION

Accordingly, it is an object of the present invention to provide a safety mechanism which is distinguished by a modest space requirement and which protects the cylinders of the web-fed rotary printing machine.

Pursuant to this object, and others which will become apparent hereafter, one aspect of the present invention resides in a safety device in which at least one of the gear wheels which place the cylinders of a printing mechanism in drive connection is formed by a wheel body and a toothed rim. An overhead coupling connects the wheel body to the toothed rim so as to limit the torque acting between the wheel body and the toothed rim. Furthermore, a gliding coat or layer is located between the wheel body and the toothed rim. The safety device reacts in a reliable manner to changes in the gear ratio relative to the given gear wheel ratio which are caused by bodies drawn into the feed gap accompanied by frictional engagement with the cylinder jackets. This prevents a twisting and bonding of the gear wheel on the cylinder pin. Moreover, the sliding layer or coat between the gear wheel and toothed rim protects the toothed rim from damage. In the event of damage, only this sliding coat and a break pin would have to be replaced, as the case may be. This can be accomplished at only a slight cost.

In a further embodiment of the invention the wheel body is connected to the toothed rim in a positively locking manner by at least one break pin.

In another embodiment the wheel body is connected with the toothed rim in a frictionally locking manner by a slip clutch.

The various features of novelty which characterize the invention are pointed out with particularity in the claims annexed to and forming a part of the disclosure. For a better understanding of the invention, its operating advantages, and specific objects attained by its use, reference should be had to the drawing and descriptive matter in which there are illustrated and described a preferred embodiment of the invention.

DETAILED DESCRIPTION OF THE PREFERRED EMBODIMENT

Figure 1:
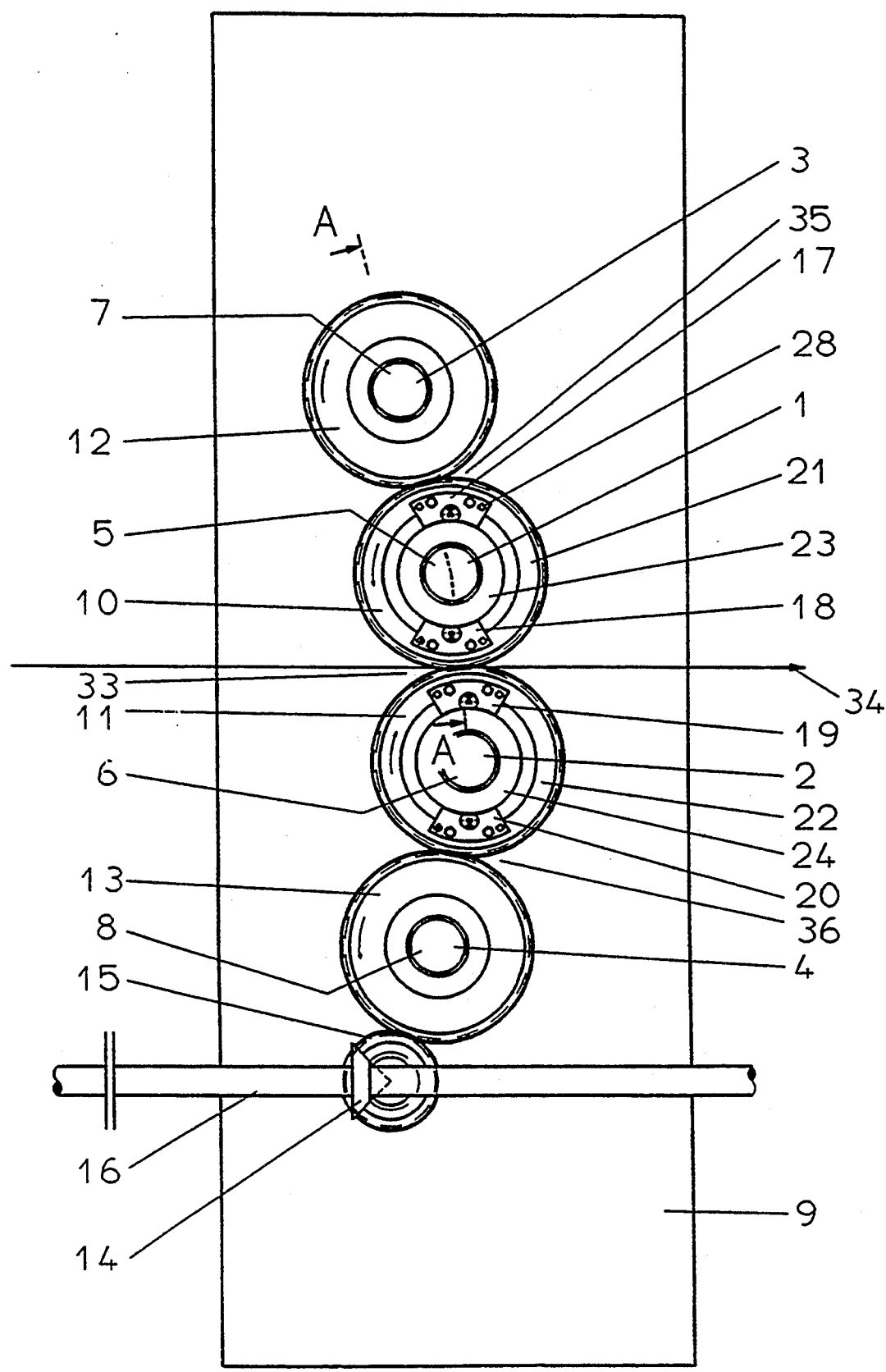
FIG. 1 shows the drive of the cylinders of a printing unit with safety devices pursuant to the present invention.

FIG. 1 is a frontal view of a printing unit which contains two transmission or transfer cylinders 1, 2 which can be adjusted relative to one another and also cooperate with a form cylinder 3, 4 in each instance. Of the cylinders 1–4 shown in FIG. 1, practically only the pins 5–8 supporting the cylinders 1–4 in the side walls 9 are visible in the drawing. A gear wheel 10–13 is clamped on each pin 5–8, the cylinder in question being in a driving connection with the adjacent cylinder or cylinders via these gear wheels 10–13. The bottom form cylinder 4 is driven by a main shaft 16 via a bevel gear stage 14 and an intermediate wheel 15.

Figure 2:
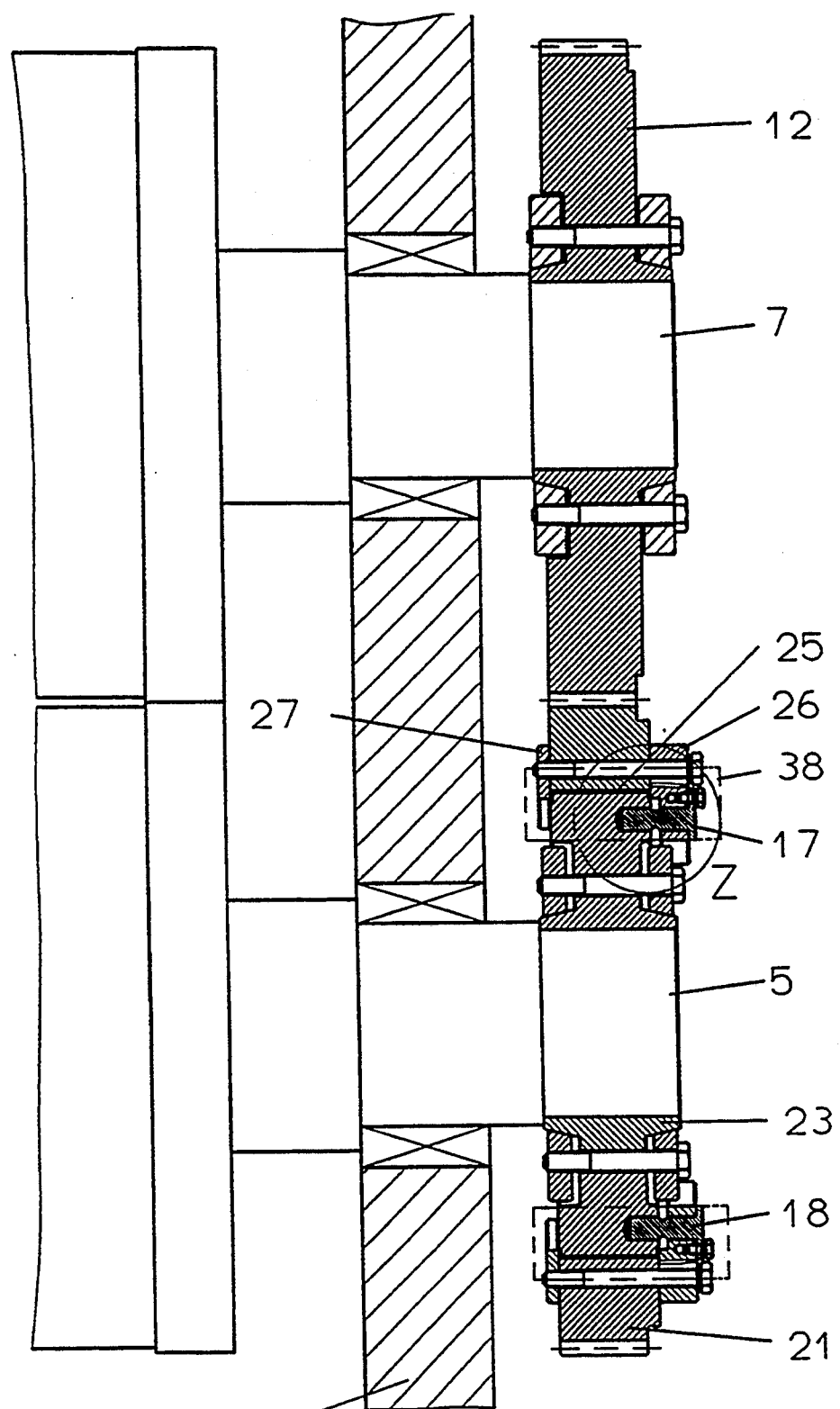
FIG. 2 shows section A—A according to FIG. 1.
Figure 3:
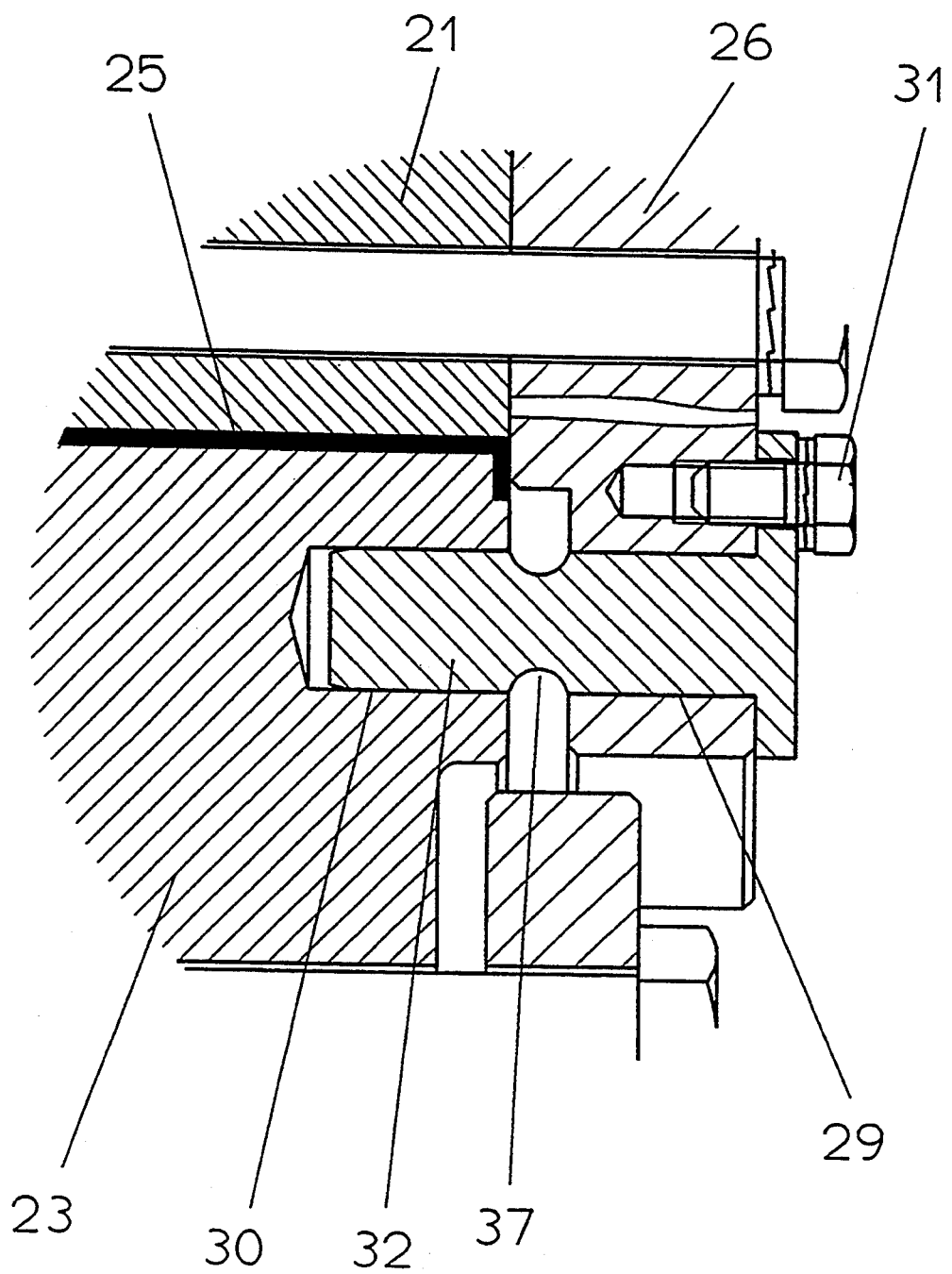
FIG. 3 shows detail Z from FIG. 2.

Each transfer cylinder 1, 2 carries two safety devices 17, 18, and 19, 20, all of which are identical. For this reason, only the construction of the safety device 17 will be described in detail (FIGS. 2 and 3). The safety devices cause the gear wheel at which they are arranged to be separated into a toothed rim and a wheel body. In a corresponding manner, each transfer cylinder 1, 2 includes a toothed rim 21, 22 and a wheel body 23, 24. A sliding layer or coat which is highly resistant to wear and pressure is located between the toothed rim 21, 22 and the wheel body 23, 24 and can be cast integrally, for example, when the two toothed gear wheel components are accommodated centrically in a device. The safety device 17 has two segments 26, 27 which are screwed to either side of the toothed rim 21. In so doing, they also overlap the wheel body 23 so that the toothed rim 21 is secured axially on the wheel body. The segment 26 is additionally secured in position by two pins 28. The segment 26 also contains a bore hole 29 which is flush with a bore hole 30 in the wheel body 23. A break pin 32 is inserted into both bore holes 29, 30 and is secured by a screw 31.

The two transfer cylinders 1, 2 form a teed gap 33 into which a web 34 is fed and imprinted as it passes between the two cylinders. Additional feed gaps 35, 36 are formed by the transfer cylinder 1 and the form cylinder 3 and by the transfer cylinder 2 and the form cylinder 4. When a foreign body enters the feed gap 35, such as when a plate breaks or a rubber blanket tears, the gear wheels 10, 12 are loaded by additional transmission forces. The break pins 32 of the safety devices 17, 18 respond to these additional transmission forces and are sheared off. The toothed rim 21 which is now released may possibly move relative to the wheel body 23. In this event, the sliding coat 25 protects the two parts which rotate relative to one another in this way. If the sliding coat 25 itself is damaged in so doing, it can be replaced at only a small cost. Similarly, the sheared off break pins 32 can simply be replaced with new ones. The strength characteristics of the break pins 32 are designed so that the break pins 32 will be sheared off before the moment which can be transmitted from the clamping fit between the wheel body 23 and the pin 5 is reached. With respect to high notched bar fatigue, these break pins are designed with a corresponding rounded portion 37.

The safety devices are advantageously arranged in pairs opposite the cylinders to prevent imbalance errors. But the arrangement of only one safety device at a cylinder would also be possible.

In a further embodiment, the wheel body 23, 24 and toothed rim 21, 22 can also be connected with one another in a frictionally locking manner via a slip clutch 38 rather than in a positive engagement. Suggested placement is indicated in FIG. 2. The construction design of such a safety device is familiar to the person skilled in the art and is described in the technical literature on the subject, e.g. in Bauer/Schneider/Kaltofen: Machinenteile, volume II, Achsen•Wellen•Lager•Kupplungen, VEB Fachbuchverlag, Leipzig, 1960, page 279.

In order to protect the feed gap 35, safety devices can also be arranged at the form cylinder 3 instead of at the transfer cylinder 1. In this case, the feed gap 33 is still protected by the safety devices at the transfer cylinder 2. The safety devices can also be arranged at adjacent cylinders, e.g. the arrangement of safety devices at the transfer cylinder 1 as well as at the form cylinder 3.

The invention is not limited by the embodiments described above which are presented as examples only but can be modified in various ways within the scope of protection defined by the appended patent claims.

We claim:

1. A safety device for cylinders with a feed gap in a web-fed rotary printing machine, which cylinders are in drive connection via gear wheels, comprising: a wheel body; a toothed rim, at least one of the gear wheels being formed by the wheel body and the toothed rim; overload coupling means for connecting the wheel body to the toothed rim so as to limit torque acting between them; and a sliding coating located between the wheel body and the toothed rim.

2. A safety device according to claim 1, wherein the coupling means includes at least one break pin which connects the wheel body with the toothed rim in a positively locking manner.

3. A safety device according to claim 1, wherein the coupling means includes a slip clutch which connects the wheel body with the toothed rim in a frictionally locking manner.

4. A safety device according to claim 2, wherein the sliding coating is of a material highly resistant to wear and pressure.

5. A safety device according to claim 2, wherein the coupling means includes two segments mounted on either side of the toothed rim so as to overlap the wheel body and axially secure the toothed rim on the wheel body, an outer one of the segments having a first bore hole and the wheel body having a second bore hole, the first and second bore holes being aligned so as to accommodate the at least one break pin.

* * * * *